(12) United States Patent
Kang et al.

(10) Patent No.: US 6,508,146 B2
(45) Date of Patent: Jan. 21, 2003

(54) PEDAL DRIVING MECHANISM OF BICYCLE

(76) Inventors: Byung-Nam Kang, 545 Bansong-dong, Haeundae-ku, Pusan (KR); Jong-Suk Kim, 545 Bansong-dong, Haeundae-ku, Pusan (KR); Hye-Jong Park, 1615 Allak-dong, Dongrae-ku, Pusan (KR)

( * ) Notice: Subject to any disclaimer, the term of this patent is extended or adjusted under 35 U.S.C. 154(b) by 0 days.

(21) Appl. No.: 09/873,180

(22) Filed: Jun. 5, 2001

(65) Prior Publication Data

US 2002/0005624 A1 Jan. 17, 2002

(30) Foreign Application Priority Data

Jun. 5, 2000 (TW) ........................................ 89209580 U (51) Int. Cl.[7] ............................. G05G 1/14; B62M 1/02
(52) U.S. Cl. ...................... 74/594.3; 74/594.1; 280/259
(58) Field of Search ........................... 74/594.1–594.6; 280/261, 259

(56) References Cited

U.S. PATENT DOCUMENTS

| 5,207,119 A | 5/1993 | Garneau | |
| 5,566,590 A | * 10/1996 | Wan | 74/594.3 |
| 5,983,751 A | * 11/1999 | DeCloux | 74/594.2 |
| 6,152,471 A | * 11/2000 | Kang et al. | 280/261 |
| 6,152,472 A | 11/2000 | Woodside | |
| 2002/0017158 A1 | * 2/2002 | Lemmens | 74/594.3 |

FOREIGN PATENT DOCUMENTS

| EP | 0 761 528 A1 | * 3/1997 | 74/594.3 |
| EP | 0650432 B1 | * 3/1999 | 74/594.3 |

* cited by examiner

*Primary Examiner*—Vinh T. Luong
(74) *Attorney, Agent, or Firm*—Birch, Stewart, Kolasch & Birch, LLP (57) ABSTRACT

A pedal driving mechanism for a bicycle which contains structurally improved pedal arms on which pedals are installed to increase the rotary radius of the pedals during the running of the bicycle to obtain optimum driving energy with minimum physical energy consumption, wherein the structure of pedaling mechanism defines a joining line formed by the tooth-coupling of a fixing gear and a rotary gear with the axle line of a driving arm at a right angle, and the trace of the linkage formed by a connection arm and a connection link is set to move in a spiral motion forced to rotate with respect to the center of the fixing gear.

5 Claims, 7 Drawing Sheets

PEDAL DRIVING MECHANISM OF BICYCLE

TECHNICAL FIELD

The present invention relates to a bicycle, and more particularly, to an adjustable pedal driving device for a bicycle which can extend, upon running, the distance between the pedal and the power transmitting axle of a chain sprocket, which transmits the rotating force of the pedals to a rear wheel. Maximum running energy with minimum driving energy consumption can thus be achieved.

BACKGROUND ART

Generally, existing bicycles have been designed to have a fixed crankshaft distance between pedal arms and pedals and therefore, its running force depends only upon the driving force of the pedals assembled with the pedal arms. Under such a driving structure of the bicycle, since the rotating force of the pedals is exerted within a predetermined rotary radius, the bicycle requires a lot of driving energy when running on an upwardly inclined road.

To improve this problem as well as to use one's driving energy effectively, various kinds of pedal mechanisms for varying the length of the pedal arms have been developed.

U.S. Pat. No. 6,152,472 discloses a variable pedal driving device for a bicycle allowing the bicycle pedals to slide along pedal arms utilizing an eccentric member. U.S. Pat. No. 5,207,119 shows two parallel pedal arms mounted on a case where a pair of sun gears are tooth-coupled to an adjacent planetary gear.

Other various kinds of pedal mechanisms for varying the length of the pedal arm have been disclosed for generating maximum torque in the region of the power stroke while in continuous pedaling.

Although various kinds of structures have been considered, there still exists a number of problems. Among the problems is the "Dead Spot" phenomenon which causes a deterioration in the efficiency of continuous pedaling and smooth pedaling.

The so called "Dead Spot", where the efficiency of the torque almost vanishes, occurs with a pedal location in the top position of the cycling path, especially when a rider of a bicycle pushes vertically downward in a vertical direction.

Due to the symmetrical location of bicycle pedals and the elliptical trace of pedaling under conventional variations of the pedal arms, the upper pedal located on the dead spot tends to be placed in a slightly behind position compared with a vertical reference line, which may cause a slight distortion of the rider's body in a backward direction in order to continue the pedaling process.

In addition to the problem related to the dead spot, the frictional loss or the distortion of the pedal arms of the prior art also hinders the length varying embodiment of pedaling to the actual application of a bicycle.

SUMMARY OF THE INVENTION

A general object of the present invention is to provide a variable pedal driving device for a bicycle which can enable pedal arms on which pedals are installed to enlarge the rotary radius of the pedals, where running, thus obtaining optimum driving energy at the expense of minimum physical energy consumption, so that when a bicycle runs in an upward climbing state or for a long distance, fatigue to a user is substantially reduced.

Specifically, the present invention is directed to providing a new pedal mechanism for eliminating the dead spot by synchronizing the generation of maximum torque in the residual moment of rotational inertia in connection with the rotary gear even though the external torque of the pedal arm exerted by an operator vanishes.

Another embodiment of the present invention provides a stable structure of the guide member for the successive motions of pedal arms. The guide member for the driving arm is devised so as to minimize the frictional losses of linear motion and the distortion or the stress exerted by the rotational motion of the pedal arm.

The structure of the pedaling mechanism under the present invention is characterized in that a joining line formed by the tooth-coupling of a fixing gear and a rotary gear is always set to meet with the axle line of a driving arm at a right angle, and the trace of linkage formed by a connection arm and a connection link is set to move as a spiral motion forced to rotate with respect to the center of the fixing gear.

BRIEF DESCRIPTION OF DRAWINGS

The present invention will become more fully understood from the detailed description given herein-below and the accompanying drawings which are given by way of illustration only, and thus are not limitative of the present invention, and wherein.

BEST MODE FOR CARRYING OUT THE INVENTION

An explanation of the detailed constitution of the present invention will now be discussed using the forementioned configuration of the device of the present invention.

An assembling pipe 3 is inserted into the hole 2 of the frame 1 of a bicycle, and is fixed tightly by means of the tightening nut 6 which combines with the screw coupling portion 4 formed at the both ends of the assembling pipe 3. A pedal axle 7 having a rectangular shaft is inserted into the hole of the assembling pipe 3 and a fixing gear 10 is tightly installed at the both ends of the pedal axle 7 by means of the screw coupling of a bolt 19. The assembled pedal axle 7 of the assembling pipe 3 having a rectangular shaft, becomes an axle module for combination with a driving module 8.

Figure 1:
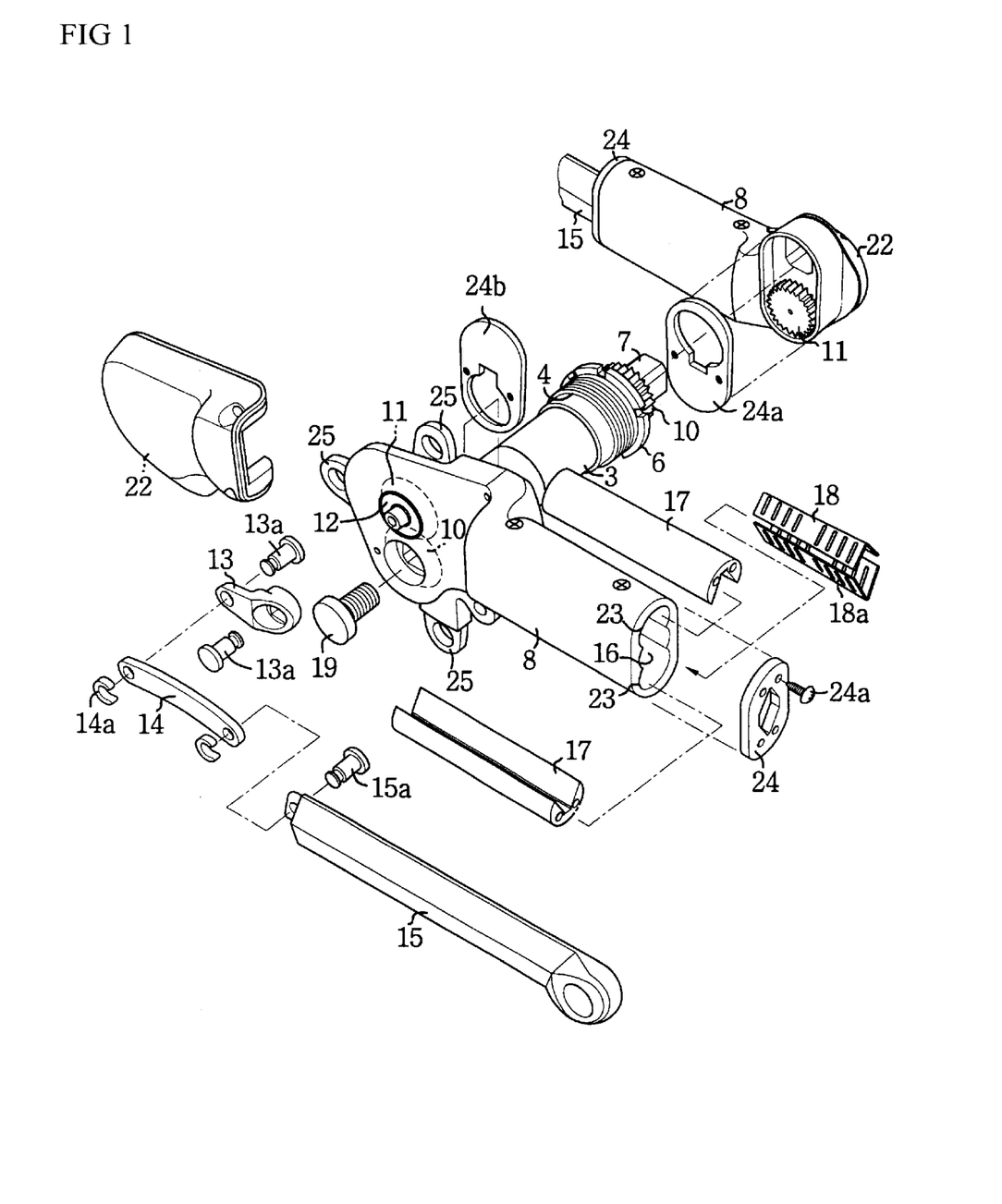
FIG. 1 is an exploded, perspective view illustrating the pedal driving mechanism of the bicycle according to the present invention.
Figure 2:
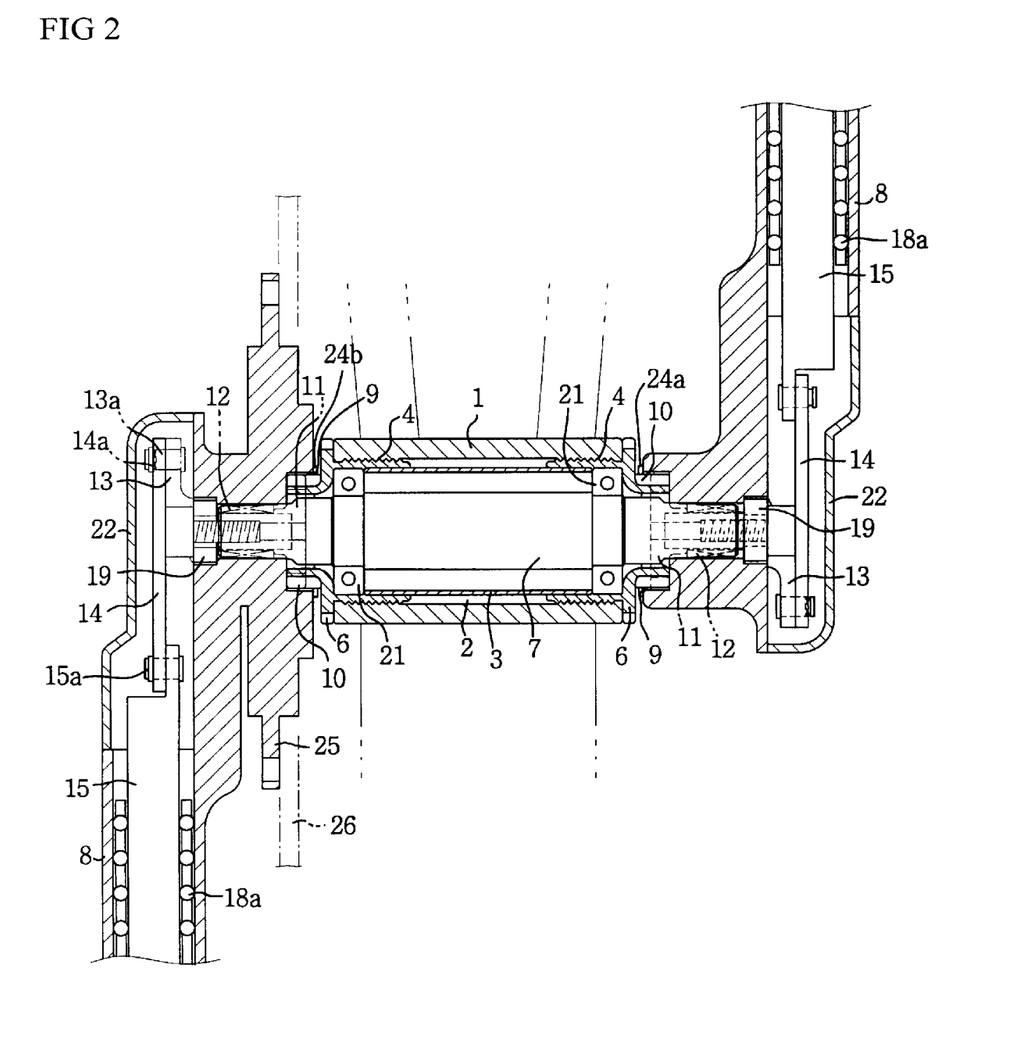
FIG. 2 relates to a cross sectional view of the pedal driving mechanism of the bicycle according the present invention, installed on a bicycle frame.

As shown on the FIG. 1 and FIG. 2, the driving module is attached in a symmetric configuration to both end portions of the axle module.

The fixing gear 10 installed on the axle module is tooth-coupled with a rotary gear 11 which is installed to be freely rotated by means of a bearing 12 in the driving module 8.

A linked part of a connection link 13 connected to freely rotate with a connection arm 14 by means of the joining pieces 13a, 14a is also rotatably attached on the rotary gear 11 by means of the joining piece 13a. The linkage portion formed by the connection link 13 with the connection arm 14 is directed to move in a circular motion about the center of the rotary gear 11 in cooperation with the joint formed by the pivotal connection with a driving arm 15.

To cooperate with the pivotal motion of the linkage portion, another joint of the connection arm 14 is formed to freely pivot with the driving arm 15 by the joining piece 15a so as to achieve a telescopic motion of the driving arm 15 in the driving module 8.

The driving arm 15 has a diamond shape configuration in cross section and that is inserted in the body of the driving module 8 which has a perforated hole of a snowman shape in cross section.

Figure 4:
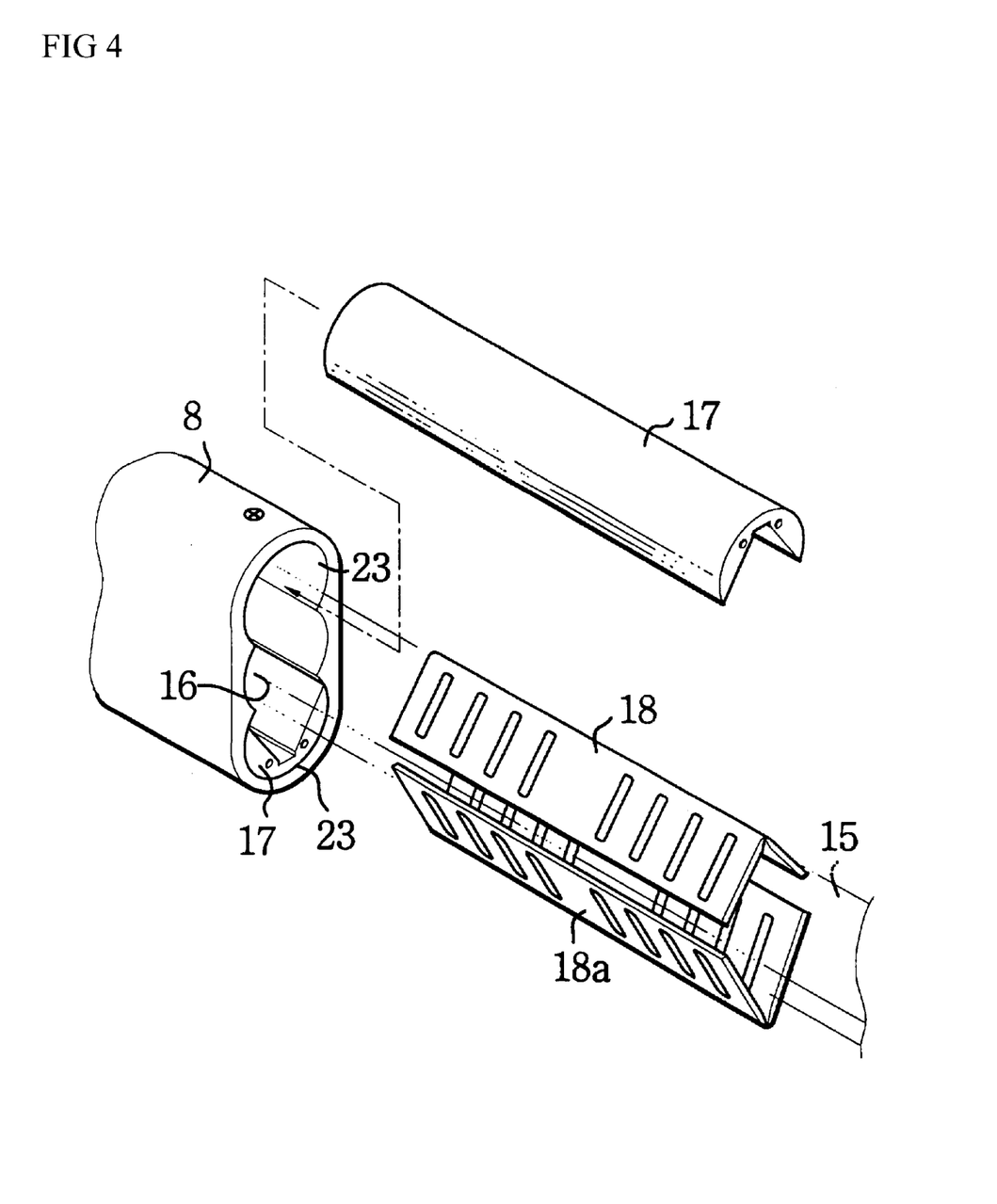
FIG. 4 illustrates a separated perspective view illustrating the assembling state of the guide members according to the present invention.
Figure 5:
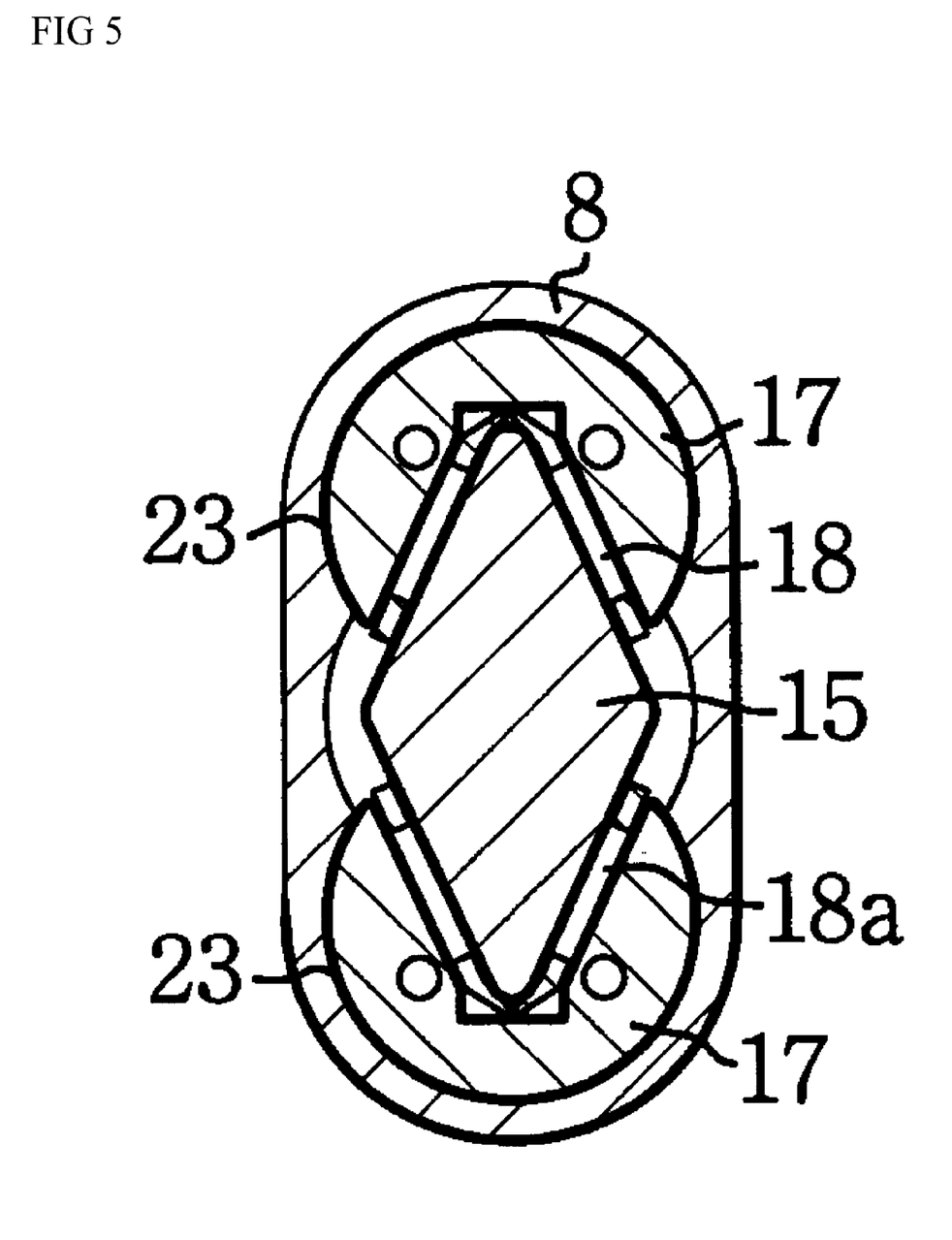
FIG. 5 illustrates a sectional view of FIG. 4.

A pair of guide blocks 17 having an elongated "V" groove in the longitudinal direction in its upper appearance and a semi-circular column in its lower appearance is installed in the circular shaped hole 23 onto the upper and lower part of the perforated hole in the body of driving module 8.

The installed guide block 17 provides a housing for the "V" shaped guide plate 18 which forms a plurality of bearings 18a on the surface. The driving arm 15 joined by the connection arm 14 is guided to move along the surface of the guide plate 18 in the body of driving module 8.

Figure 3:
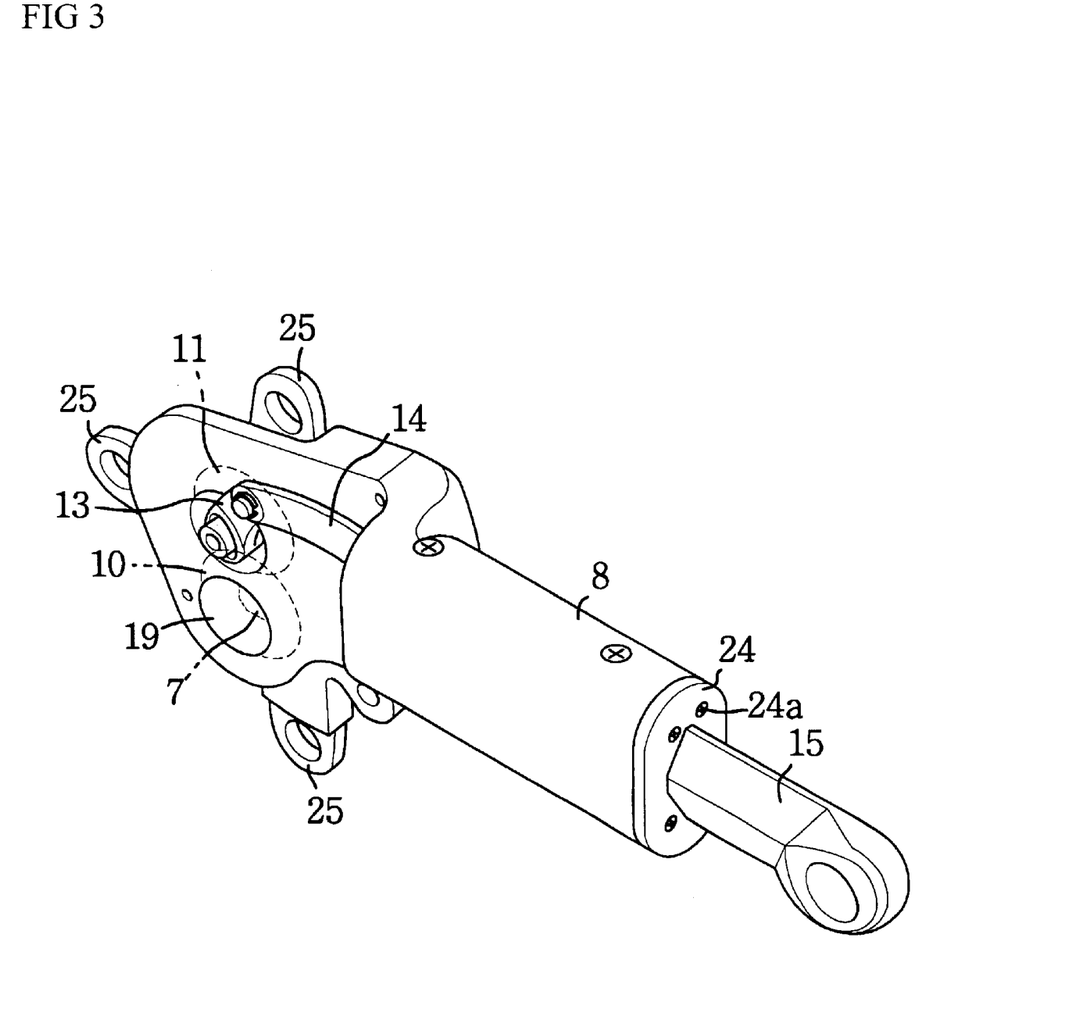
FIG. 3 is a perspective view of the driving module according to the present invention.

In addition, an installation member 25 adapted to engage a chain sprocket is coupled with the driving module 8, and the shape of installation member 25 is not restricted.

For the purpose of safety or protection, a cover 24 for protecting the perforated holes 23, a cover 22 for protecting the linkage part and a cover 24a, 24b for protecting gearing element are respectively installed.

The tooth ratio of rotary gear to the fixing gear is a ratio of 1:1 which results in that a rotation of the rotary gear equals one cycle of the driving module with respect to the axle of the pedals.

The rotary gear 11 which is tooth-coupled with the fixing gear 10 is rotated at one time centering around the fixing gear 10, and the driving arms 15 for the pedals are slidable forwardly or backwardly to/from the driving module 8 and are rotated in a long oval shape.

In the case of a tooth ratio of 2:1, the rotary gear 11 which is tooth-coupled with the fixing gear 10 rotates two times centering around the fixing gear 10, and the driving arm of the pedals 15 which slide forwardly or backwardly to/from the driving case 8 are rotated in a perfectly circular shape, contrary of the tooth ratio of 1:1.

Based on the above mentioned structural features, the pedal driving mechanism of the present invention is related to the mechanism of length variation and the elimination of the dead spot, simultaneously, in order to achieve a maximum efficiency in pedaling a bicycle.

Thus, the typical mechanism of the present invention for eliminating the dead spot is first, that the joining line formed by the tooth coupling of fixing gear 10 and the rotary gear 11 is always set to meet with the line of driving arm in a right angle and secondly, the linkage formed by the connection arm 14 and the connection link 13 is free to pivot in accordance with the resultant force exerted by the driving arm 15 and the tooth-coupled gears such that the trace of the linkage motion would be a spiral motion forced to rotate with respect to the center of the fixing gear 10.

More in detail, the mechanism of the pedaling under the present invention will be described hereinbelow with the explanation of the FIG. 6 and FIG. 7.

Figure 6:
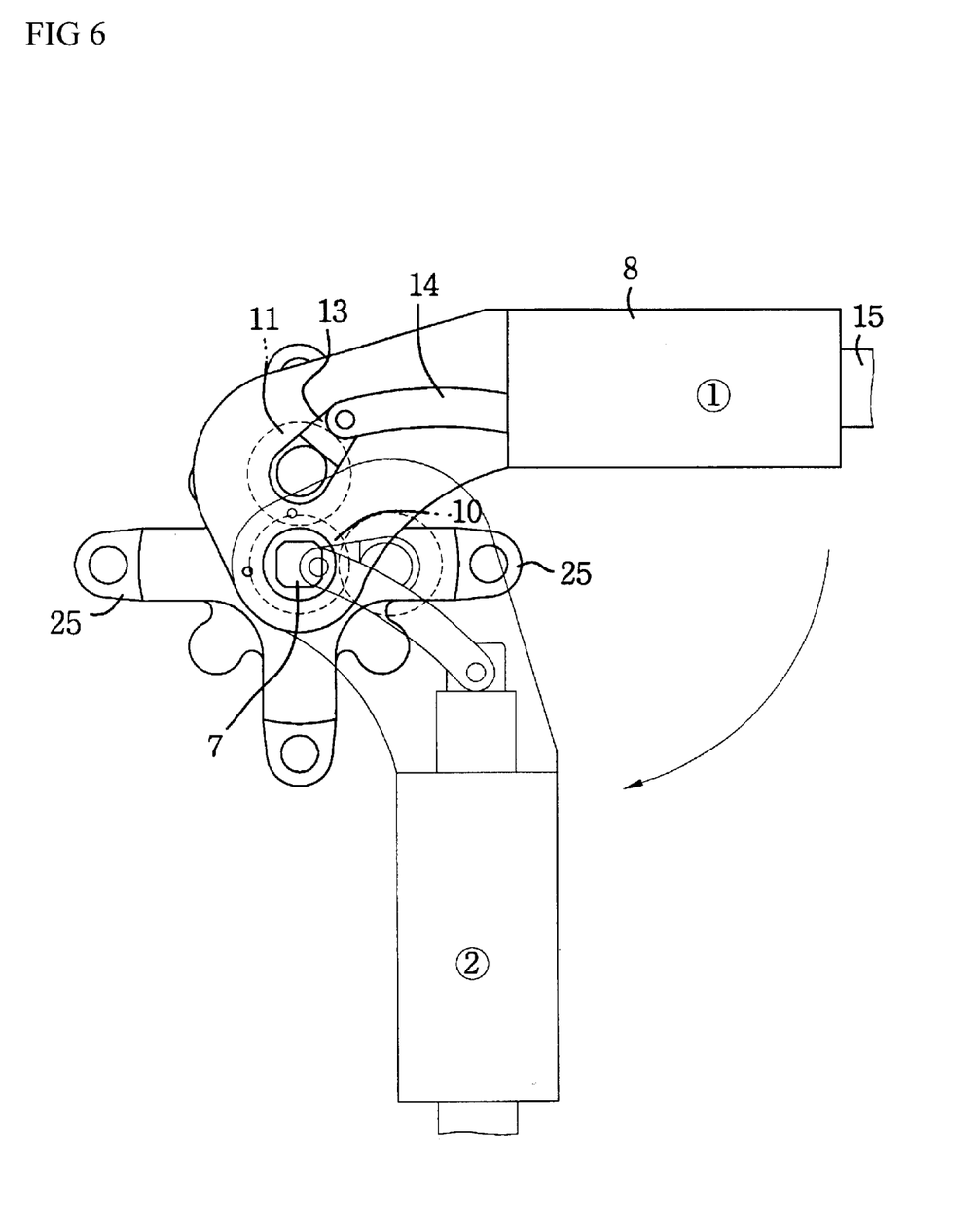
FIG. 6 is a side view illustrating the telescopic embodiment in the region of power stroke according to the present invention.
Figure 7:
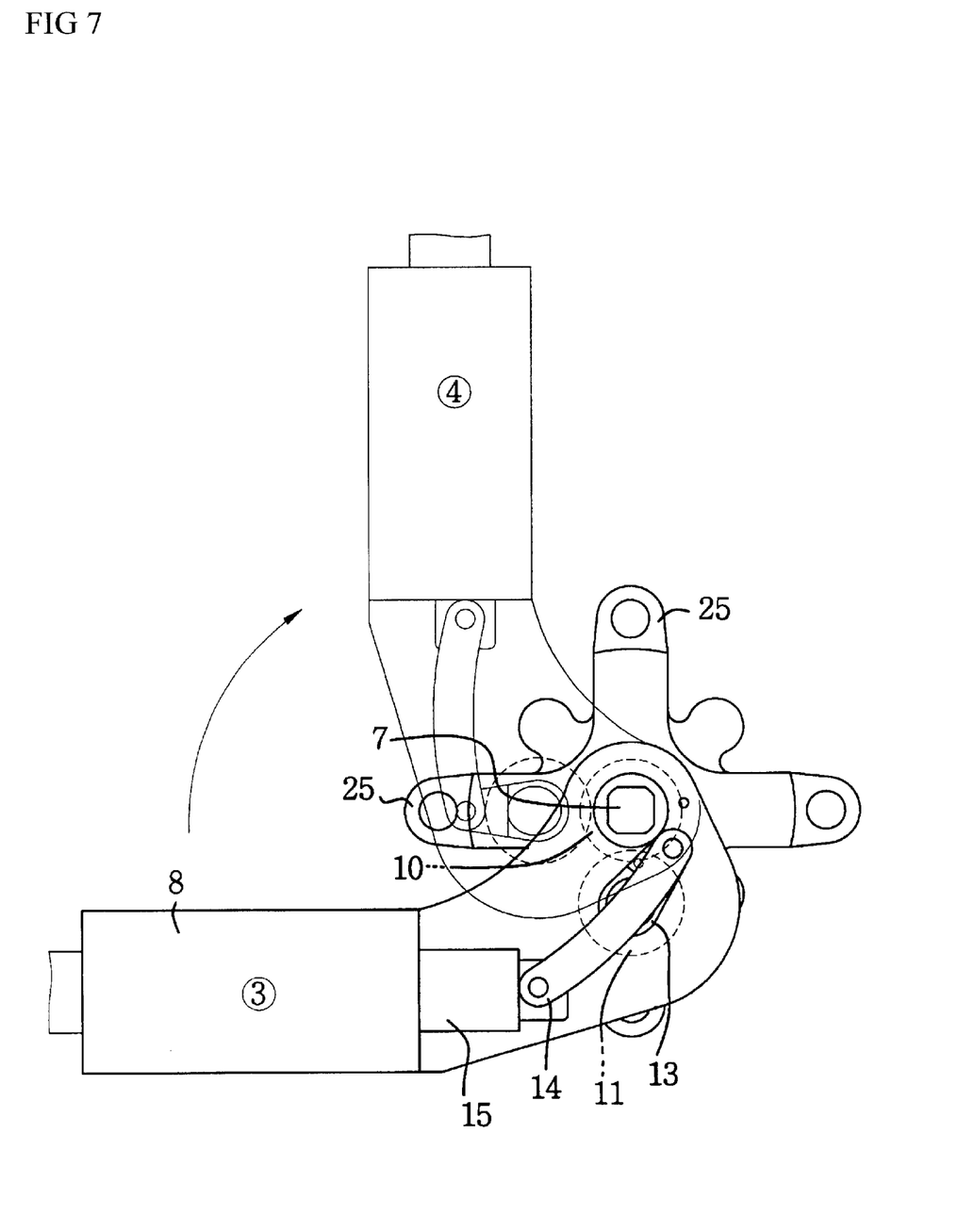
FIG. 7 is a side view illustrating the telescopic embodiment in the region of return stroke according to the present invention.

FIG. 6 is a side view illustrating the telescopic embodiment in the region of the power stroke according to the present invention and FIG. 7 is a side view illustrating the telescopic embodiment in the region of the return stroke according to the present invention.

As shown on the location ① of FIG. 6, when the driving module 8 is placed a horizontal line in the direction of 3 o'clock resulting a maximum length of the pedal arm, the rotary gear 11 connected with the pedal is located at the top position on the periphery of the fixing gear 10. Accordingly the linkage formed by the connection arm 14 and the connection link 13 is stretched to a maximum length so that the driving arm 15 is fully extended from the housing of driving module 8. The fully extended driving arm 15 provides a maximum torque for driving the chain sprocket of a bicycle.

But the driving module 8 denoted as the location ③ of FIG. 7 corresponding to the opposite pedal of the paired driving module ① is placed a horizontal line of the direction of 9 o'clock which has a minimum length of the pedal arm. In this case, the rotary gear 11 connected with the pedal is located at the bottom position on the periphery of the fixing gear 10 and the linkage formed by the connection arm 14 and the connection link 13 is contracted in minimum length so that the driving arm 15 is fully retracted from the housing of driving module 8.

When the driving module 8 is placed in a vertical line in the direction of 6 o'clock which become a middle length of the pedal arms as shown on the situation denoted as the location ② of FIG. 6, the rotary gear 11 connected with the pedal is located at the side position on the periphery of the fixing gear 10 and the linkage formed by the connection arm 14 and the connection link 13 is stretched in middle length. At this location, the rotary gear 11 has a maximum rotational torque is enhanced by the gravitational force of the rotary gear 11 with respect to the center of the fixing gear 10 because no gravitational constraint exists on the rotary gear 11. At this location, it should be noted that although, the external torque exerted by a leg is terminated, the internal torque actuated by the rotary gear is maximized at this stage. Accordingly, the maximized internal torque is transmitted through the axle module and it become a rotational torque to the oppositely located driving module in the location ④ in order to eliminate the dead spot. The occurrence of a dead spot is related to the position which a driving module is placed along a vertical line in the direction of 12 o'clock which has a middle length of the pedal arm as denoted by location ④ of FIG. 7. Due to the internal torque and the rotational inertia of the rotary gear 11, the location of the driving module 8 under the directions of a vertical line denoted as ②, ④, is very unstable and tends to move into the direction of rotation. As a result, the dead spot related to the position of the driving module ④ is immediately eliminated.

Furthermore, the present invention is directed to minimizing the frictional loss or resistance and maximizing the stable telescopic motion in the direction of the pedal arm. In order to achieve a stable telescopic operation with respect to the torque of a pedal, the whole length of the pedal arm has to be protected by a guide member during the telescopic motion. Since the guide block 17 and a plurality of needle bearings 18a on the V-shaped guide plate 18 is set to the axle direction of the driving module, the smooth operation, and secureness and endurance of the telescopic motion of the driving arm 15 are enhanced.

An adjustable pedal driving device for a bicycle constructed to extend to a maximum extent the rotary radius between the driving arm and the pedals, when the pedals are driven in the advancing direction, thereby obtaining a maximum running ability while minimizing driving energy consumption. The device is especially useful for a racing bicycle and a mountain bicycle. The application of present invention is not limited to a bicycle but can be widely applicable to the mechanical structure of a propulsion device, for example, an exercise machine, and the like.

Those skilled in the art will readily recognize that these and various other modifications and changes may be made to the present invention without strictly following the exemplary application illustrated and described herein and without departing from the true spirit and scope of the present invention.

What is claimed is:

1. A pedal driving mechanism for a bicycle in which the distance between pedals and a pedal shaft is adjusted, which comprises:

a pedal axle;

a fixing gear installed at the both ends of the pedal axle;

a driving module having an aperture therein and containing a rotary gear having a same tooth-ratio with that of the fixing gear, and installed to be freely rotating in the driving module;

guide blocks disposed in the guide blocks of the driving module; and a driving arm guided by the guide plates in the driving module, wherein a joining line formed by the tooth-coupling of the fixing gear and the rotary gear meets an axle line of the driving arm at a right angle, and a trace of linkage formed by the connection arm and the connection link is set to move in a spiral motion about an axis extending through the center of the fixing gear.

2. The pedal driving mechanism of claim 1, wherein the pedal axle has a rectangularly figured shaft.

3. The pedal driving mechanism of claim 1, wherein the rotary gear is freely rotatable within the driving module by the use of a bearing.

4. The pedal driving mechanism of claim 1, wherein the guide blocks have a substantially V-shaped configuration.

5. The pedal driving mechanism of claim 1, wherein the driving arm has a diamond cross sectional shape and is disposed within V-shaped guide plates.

* * * * *